S. G. NEAL.
AIR BRAKE APPARATUS.
APPLICATION FILED SEPT. 18, 1918. RENEWED MAR. 3, 1922.

1,434,746.

Patented Nov. 7, 1922.

8 SHEETS—SHEET 1.

Inventor
Spencer G. Neal
By his Attorneys

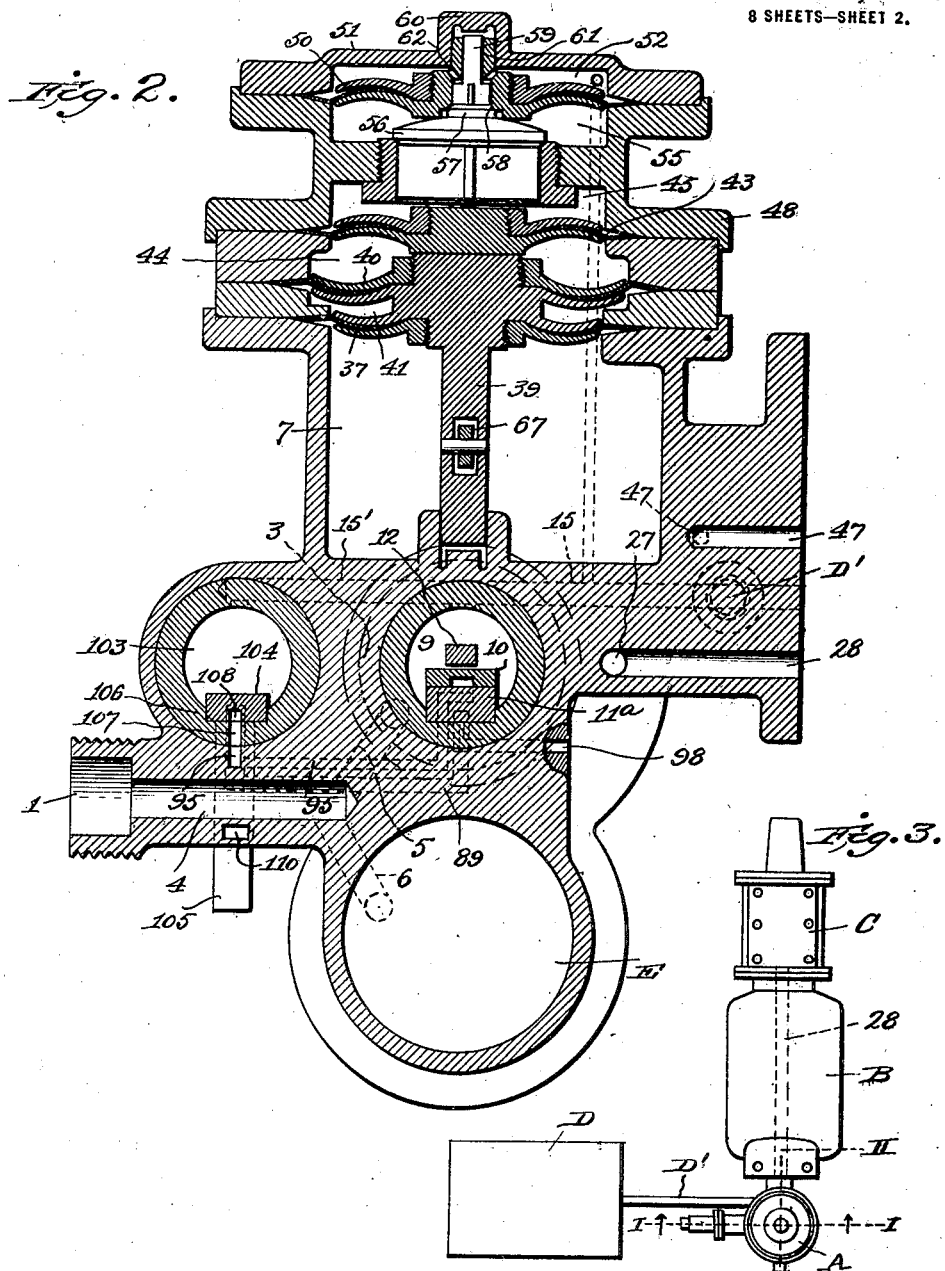

S. G. NEAL.
AIR BRAKE APPARATUS.
APPLICATION FILED SEPT. 18, 1918. RENEWED MAR. 3, 1922.
1,434,746.
Patented Nov. 7, 1922.
8 SHEETS—SHEET 3.
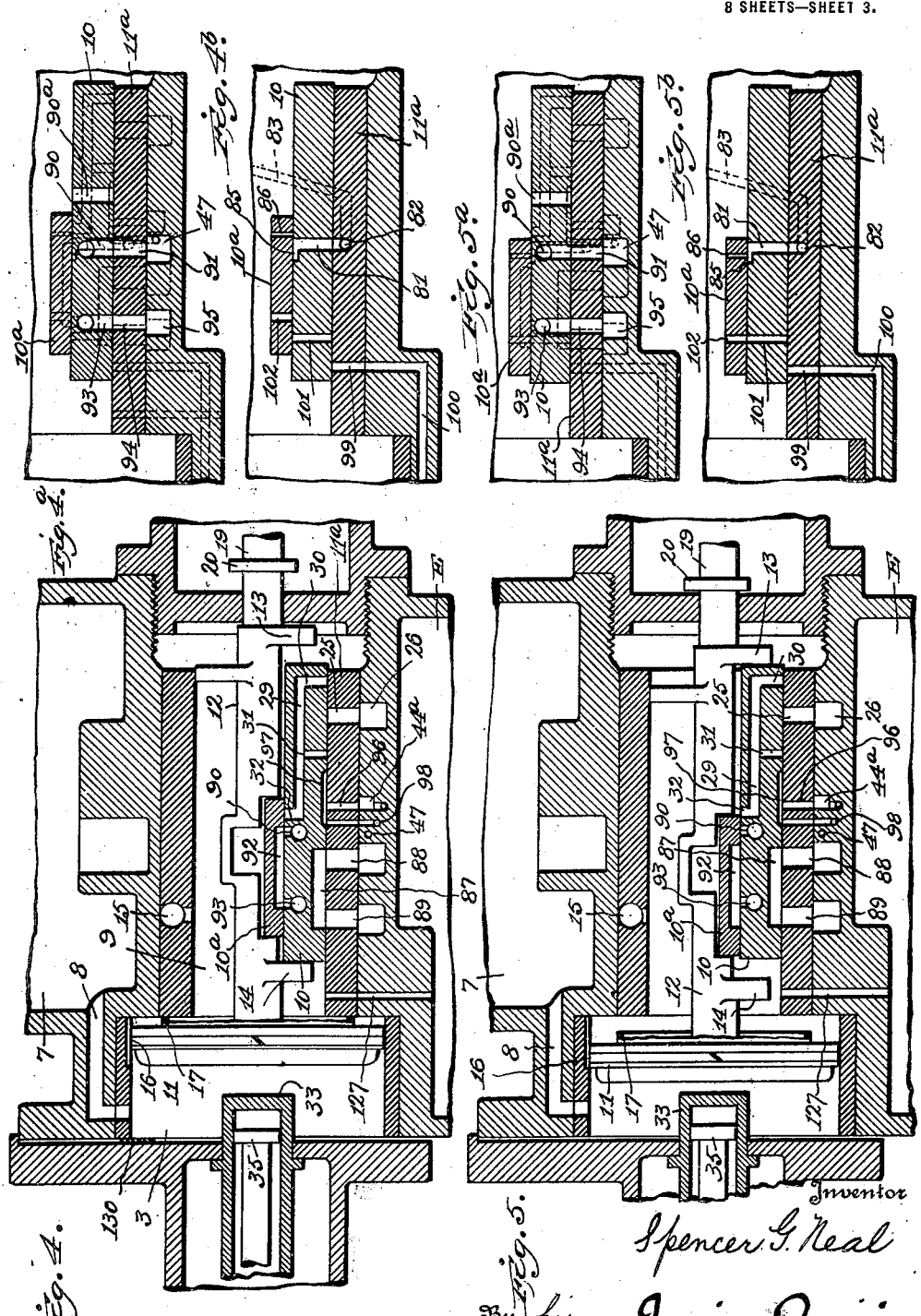

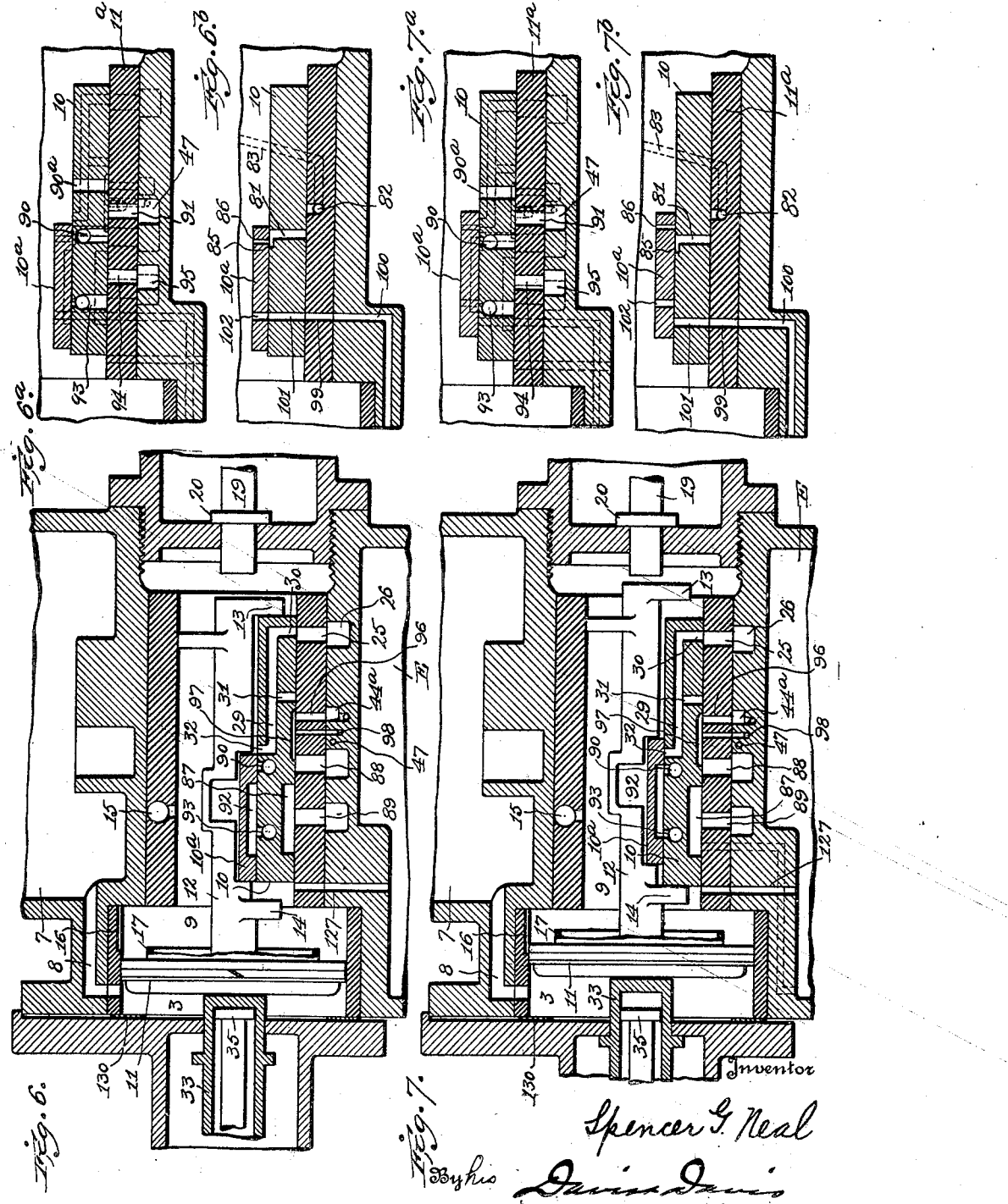

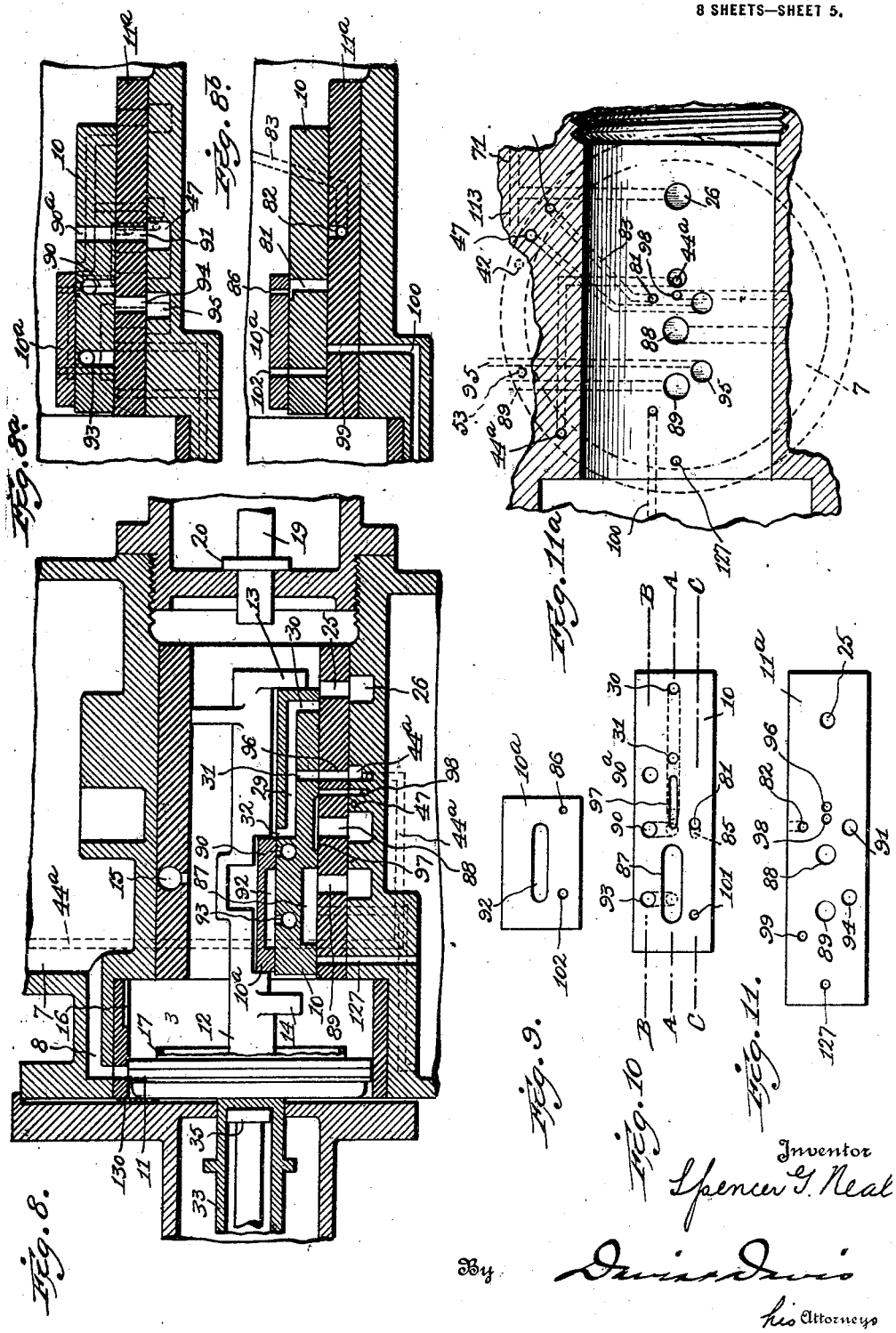

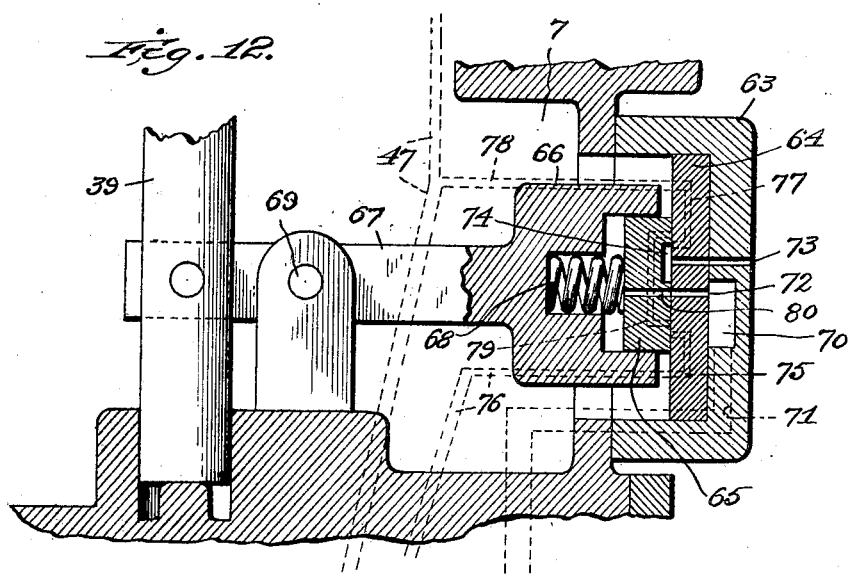
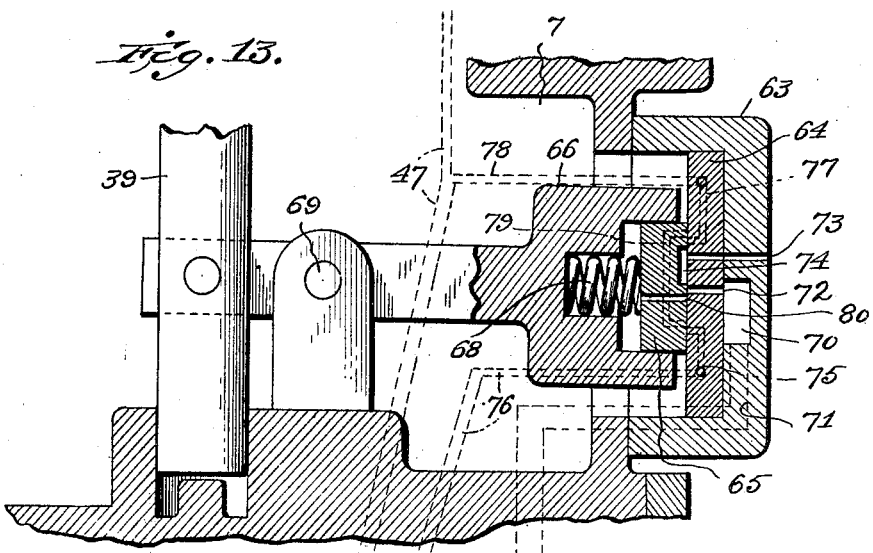
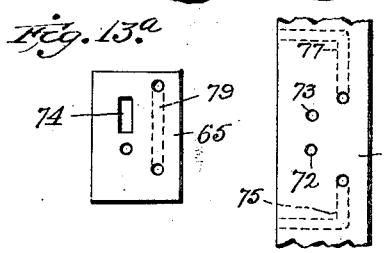

S. G. NEAL.
AIR BRAKE APPARATUS.
APPLICATION FILED SEPT. 18, 1918. RENEWED MAR. 3, 1922.

1,434,746.

Patented Nov. 7, 1922.

8 SHEETS—SHEET 7.

Inventor
Spencer G. Neal
By his Attorneys
Davis Davis

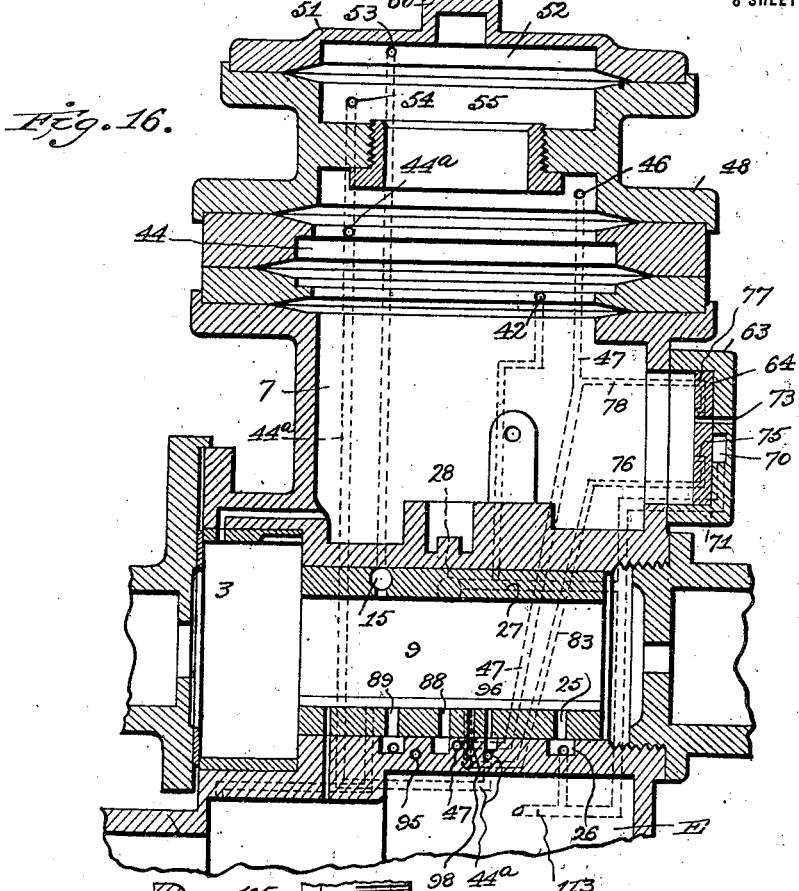
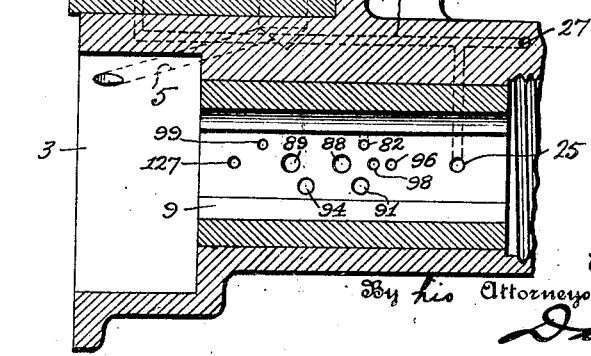

Patented Nov. 7, 1922.

1,434,746

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

AIR-BRAKE APPARATUS.

Application filed September 18, 1918, Serial No. 254,553. Renewed March 3, 1922. Serial No. 540,919.

*To all whom it may concern:*

Be it known that I, SPENCER G. NEAL, a citizen of the United States, and resident of the borough of Manhattan, city, county, and State of New York, have invented certain new and useful Improvements in Air-Brake Apparatus (Case No. 35), of which the following is a specification.

This invention relates to improvements in that type of air brake apparatus illustrated in my Patent No. 1,183,103, dated May 16, 1916; and one of the main objects of the invention is to simplify and improve the construction of the triple valve designed for use in air brakes of the type shown in the said patent.

An important object of the invention is to provide means for admitting brake pipe reservoir air to the brake cylinder for a service application of the brakes, and an independently controlled valve through which a graduated release of the brakes may be obtained.

Another object of the invention is to provide a valve cooperating with the main valve for securing the quick release of the brakes.

Another object of the invention is to provide means to prevent overcharging of the brake pipe reservoir and the emergency reservoir upon a full release of the brakes.

A further object of the invention is to provide means for slowly releasing brake cylinder pressure substantially uniformly throughout the train in the full-release position of the triple valve and with full-release pressure.

There are many other important objects and advantages of the invention which will be more fully hereinafter set forth.

Figure 1:
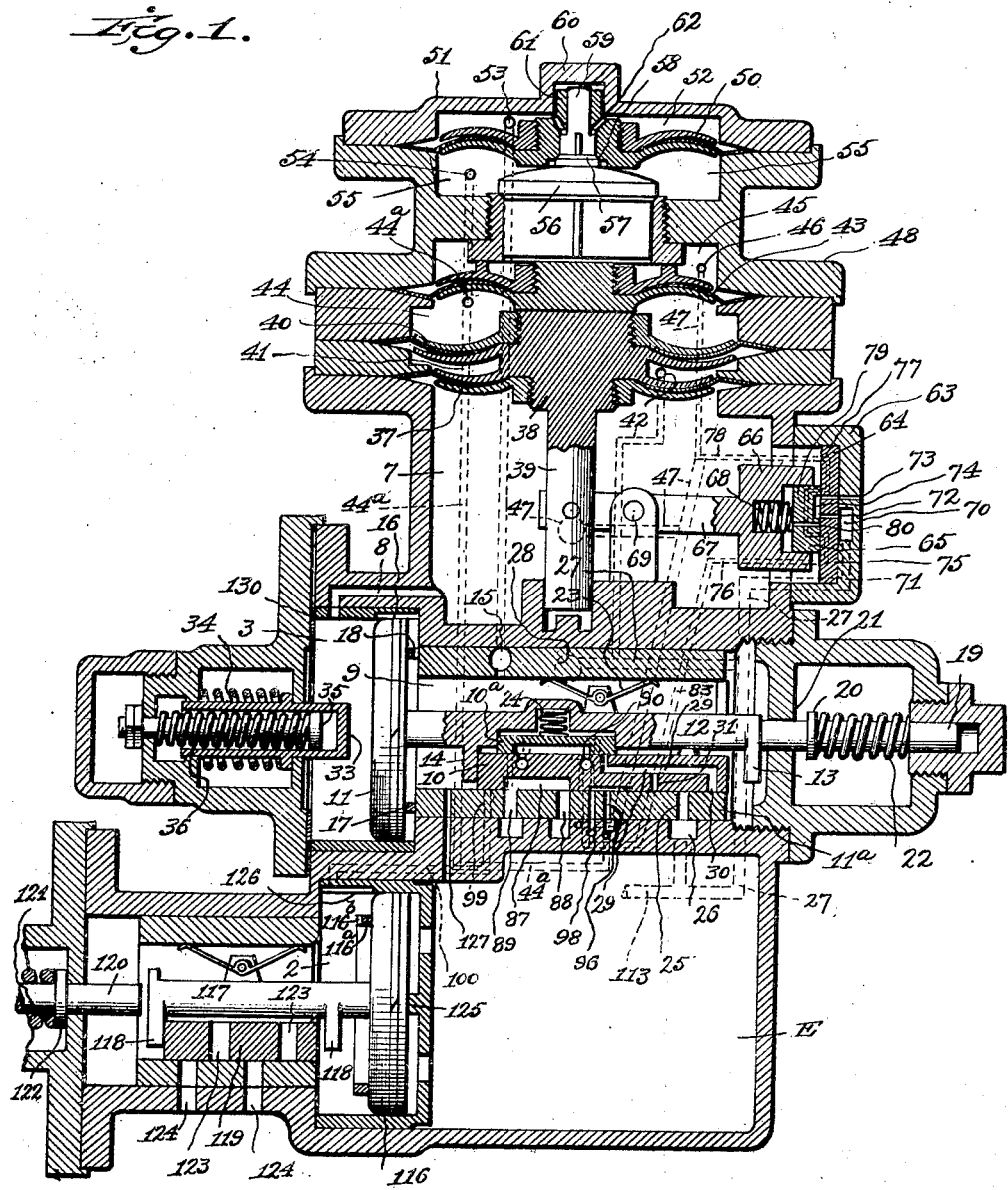
Figure 1B:
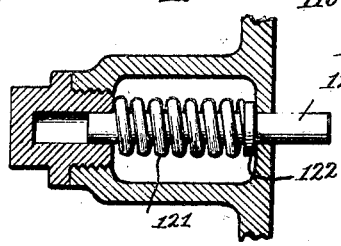
Figure 14:
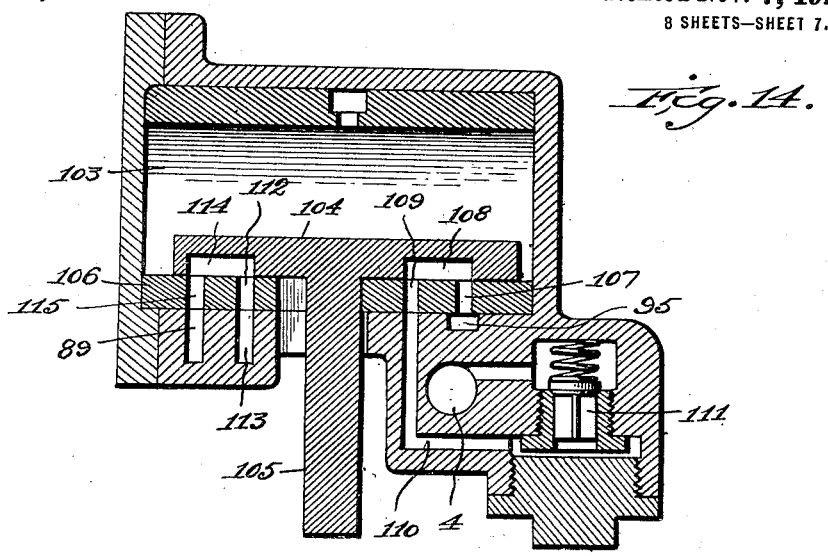
Figure 15:
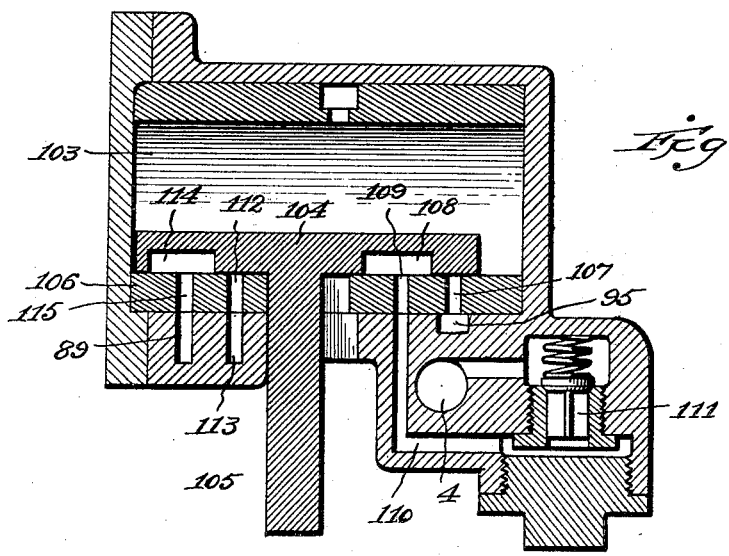

In the drawings, Fig. 1 is a central vertical sectional view of the triple valve taken on the line I—I of Fig. 3;

Fig. 2 a similar view taken on the line II—II of Fig. 3;

Fig. 3 a diagrammatic plan view of a braking unit;

Fig. 4 a sectional view showing the main slide valve and the graduating valve in full-release and service reservoir charging position, the section being taken on the line indicated by A—A in Fig. 10;

Fig. 4ª a similar view taken on the line indicated by B—B of Fig. 10;

Fig. 4ᵇ a similar view taken on the line C—C of Fig. 10;

Fig. 5 a vertical sectional view with the main slide valve and the graduating valve in emergency reservoir charging position, the section being taken on the line A—A of Fig. 10;

Figs. 5ª and 5ᵇ similar sectional views taken on the lines B—B and C—C of Fig. 10;

Figs. 6, 6ª and 6ᵇ sectional views showing the main slide valve and the graduating valve in service application position, the sections being taken on the lines A—A, B—B and C—C indicated in Fig. 10;

Figs. 7, 7ª and 7ᵇ sectional views showing the main slide valve and the graduating valve in service lap position, the sections being taken on the lines A—A, B—B and C—C of Fig. 10;

Figs. 8, 8ª and 8ᵇ sectional views showing the main slide valve and the graduating valve in emergency position, the sections being taken on the lines A—A, B—B and C—C of Fig. 10;

Fig. 9 a detail view of the under side of the graduating valve;

Fig. 10 a detail view of the under side of the main slide valve;

Fig. 11 a detail view of the main slide valve seat;

Fig. 11ª a detail view of the interior of the main slide valve casing, showing the ports below the slide valve seat;

Fig. 12 a detail vertical sectional view of the pilot valve in application position;

Fig. 13 a similar view with the pilot valve in lap position;

Fig. 13ª a detail face view of the pilot valve;

Fig. 13ᵇ a detail view of the pilot slide valve seat;

Fig. 14 a detail vertical sectional view of the quick-release valve in quick-release position;

Fig. 15 a similar view, the quick-release valve being in inoperative position;

Fig. 16 a detail elevation of the triple valve casing, the operating parts being removed to better show the ports and passages;

Fig. 17 a detail horizontal view of the triple valve casing through the main slide valve chamber and the quick-release valve chamber; and Fig. 18 a detail sectional view showing the emergency replacing spring and plunger.

Referring to the various parts by reference characters, A designates the triple valve, B the emergency reservoir, C the brake cylinder, D the brake pipe reservoir, and E the quick-action reservoir, the latter being embodied in the triple valve structure.

The brake pipe 1 is connected to the triple valve and leads into a passage 4 which is connected at its inner end by a port 5 with the service brake pipe chamber 3; and by a port 6 with the emergency brake pipe chamber 2. Above the chamber 3 is formed the actuating brake pipe chamber 7 which is in open communication with the chamber 3 through the passage 8. Connected to the service brake pipe chamber 3 is a brake pipe reservoir chamber 9, this latter chamber also constituting the main slide valve chamber, the lower wall of which forms a seat for the main slide valve 10. This main valve is primarily a brake application valve in that it controls the main flow of air to the brake cylinder. A separate and independently operating valve controls the flow of air from the brake cylinder in graduated-release operations. The main slide valve cooperates with a quick-release valve but operates idly in release operations, when the triple valve is adjusted for a graduated release of the brakes. The main slide valve, of course, has other functions, such as controlling the supply of air to the quick-action reservoir, as will be more fully hereinafter described. In the service brake pipe chamber 3 is mounted a main slide valve actuating piston 11, and to said piston is connected a stem 12 which extends longitudinally through the brake pipe reservoir chamber 9, said piston stem being formed with depending lugs 13 and 14 which are adapted to engage the ends of the main slide valve to actuate the same, as will be more fully hereinafter described. The main piston stem is recessed on its lower side to receive a graduating valve 10ª, said valve operating on top of the main slide valve and moving with the said stem. The brake pipe reservoir D is directly connected to the brake pipe reservoir chamber 9 through passage 15 and the connected pipe D¹. The service brake pipe chamber 3 is formed with a charging groove 16 near its inner end, which is adapted to connect the said chamber with the brake pipe reservoir chamber 9 when piston 11 is at the inner end of its movement and in brake pipe reservoir charging position. The piston 11 is provided on its inner face with a contact ring 17 which is adapted to engage the inner wall of said chamber when the piston is at the inner limit of its travel; and in said contact ring is formed a restriction groove 18 through which the air will pass when charging brake pipe reservoir. The distance between the lugs 13 and 14 on the piston stem is greater than the length of the main slide valve, so that the said stem may have a limited movement independently of the slide valve for the purpose of operating the graduating valve without moving the main slide valve. An actuating stem 19 is mounted axially in line with the main piston stem, said actuating stem being formed with a head 20 adapted to be forced against a stop wall 21 by an actuating spring 22. The main slide valve is provided with the usual spring 23 for holding it to its seat; and the graduating valve is provided with a spring 24 for holding it to its seat on the upper surface of the main slide valve.

The main slide valve seat 11ª is formed with a brake cylinder port 25 which is connected by a passage 26 to a passage 27 leading directly to the brake cylinder through a pipe 28 (see Fig. 3) extending through the emergency reservoir. The main slide valve is provided with a longitudinally extending passage 29 which opens through the lower face of the slide valve by means of a port 30, said port 30 being adapted to register with the brake cylinder port 25 when the main slide valve is in service position, as shown in Fig. 6. The slide valve is also formed with a port 31 which is connected to the passage 29 and opens on the face of the slide valve, the said port 31 being adapted to register with a port 96 when the slide valve is in emergency position, as shown in Fig. 8. A port 32 formed in the upper face of the main slide valve opens into the passage 29, the said port being controlled by the movements of the graduating valve and being uncovered when the main slide valve is in service position, as shown in Fig. 6, to thereby permit brake pipe reservoir air to flow from chamber 9 directly to the brake cylinder through said port, passage 29, brake cylinder port 25 and the passages connecting the latter port to said cylinder. This port 32 is also uncovered when the triple valve is in emergency position, as shown in Fig. 8.

Extending into the service brake pipe chamber 3 is a hollow spring-pressed plunger 33, said plunger being forced into the path of the main piston 11 by a service spring 34, the said plunger being adapted to be engaged by the piston when the slide valve is moved to service application position. Within the plunger 33 is mounted a spring-pressed emergency plunger 35 which is forced inwardly toward the piston by means of an emergency spring 36. The head of the emergency plunger is adapted to be engaged by the head of the service plunger when the slide valve is moved to emergency position, as will be fully hereinafter set forth.

The upper wall of the actuating brake pipe chamber 7 is formed by a transverse actuating diaphragm or abutment 37, so that said abutment will move in response to variations in pressure in the chamber 7. Diaphragm 37 is secured at its center to a head 38, said head being formed with a central depending actuating stem 39. The lower end of this stem is guided in a socket formed in the lower wall of the chamber 7. Above the diaphragm 37 the head 38 is formed with radially extending flanges which support a controlling diaphragm 40, this diaphragm being larger in area than the actuating diaphragm 37. The two diaphragms 37 and 40 move together, being rigidly connected by means of the central head. These two diaphragms are spaced apart sufficiently to form a brake cylinder chamber 41 between them, said chamber being in communication with the brake cylinder passage 26 by means of a port and passage 42. By means of this arrangement brake cylinder pressure will be always registered in the brake cylinder chamber 41. Above the controlling diaphragm and spaced a suitable distance therefrom is arranged an emergency diaphragm or abutment 43, said diaphragm being of the same area as the actuating diaphragm, and, of course, smaller than the controlling diaphragm 40, and being in direct contact with head 38. Between the emergency abutment 43 and the controlling abutment or diaphragm is formed a chamber 44 which is open to atmosphere through passage 44ª at all times except during an emergency application of the brakes, as will be more fully hereinafter described.

The diaphragms 37, 40 and 43 move together at all times; the upward movement thereof being limited by stops formed on the upper plate of the diaphragm 43 engaging the casing of the valve 56. The lower end of stem 39 forms a stop to limit the downward movement of the said diaphragms. Above the emergency diaphragm is formed an emergency reservoir chamber 45, said chamber being connected through port 46 to passage 47, this latter passage leading to a valve-controlled port in the main slide valve seat, as will be more fully hereinafter described. It is manifest that brake pipe pressure will be registered, at all times other than in emergency position, below the actuating diaphragm 37; that brake cylinder pressure will be always registered in the brake cylinder chamber and below the controlling diaphragm 40, and that emergency reservoir pressure will be always registered above the emergency diaphragm 43, the chamber below said diaphragm being vented to atmosphere as described. The diaphragms are spaced apart around their rigid marginal edges by means of spacing rings and said rings are secured in position by bolts passing through them and flanges on the body of the triple valve casing. The emergency reservoir chamber 45 is formed in the lower part of a casting 48 which is secured to the top of the triple valve body. In said casting above the emergency reservoir chamber is formed a cavity 55 across the upper end of which is secured a supplemental emergency diaphragm or abutment 50. Secured over the supplemental emergency diaphragm is a cap 51 which forms a supplemental brake pipe reservoir chamber 52 above the diaphragm 50, this chamber being in direct communication with the brake pipe reservoir chamber 9 through port and passage 53 so that brake pipe reservoir pressure will be always registered on said supplemental emergency diaphragm. The chamber 55 below the supplemental emergency diaphragm is vented to atmosphere at all times except during emergency applications of the brakes, through port and passage 54 which connect with the passage 44ª leading to the atmosphere from the chamber 44.

In the wall between the emergency reservoir chamber 45 and the vented chamber 55 is arranged a valve seat adapted to receive a downwardly seating check valve 56 of large area, said valve controlling communication between the said two chambers. In direct contact with the upper side of the valve 56 is a smaller valve 57 which is adapted to cooperate with a valve seat 58 formed in the hub of the diaphragm 50 and controlling communication through said diaphragm. The valve 57 is provided with an upwardly extending valve stem 59 which is reduced at its upper end and is adapted to contact with a stop 60 formed on the cap 51. The hub of the diaphragm 50 is formed with a tubular extension 61 through which projects the valve stem 59, the said tubular extension terminating slightly below the upper end of the said valve stem so that when the stem is in engagement with its stop the diaphragm may have an independent upward movement. Ports 62 communicating with the supplemental brake pipe reservoir chamber 52 are controlled by the valve 57 so that when the diaphragm is moved upwardly away from the valve 57, as will be more fully hereinafter described, air may freely flow from the chamber 55 through said ports into the supplemental brake pipe reservoir chamber 52, at which time the port venting the chamber 55 to atmosphere will be closed.

A pilot valve casing 63 (see Figs. 1, 12 and 13) is formed at one side of the actuating brake pipe chamber 7, said chamber being fitted with a valve seat 64 on which slides a pilot valve 65. The said valve is held in a fork 66 formed at the outer end of a lever 67, a spring 68 holding said valve to its seat. The lever 67 is pivoted at 69 in the chamber 7 and is loosely connected at its end to the actuating stem 39. It is manifest that the pilot valve will be moved by the actuating diaphragm. The outer wall of the valve chamber 63 is formed with a brake cylinder cavity 70 which is connected by a passage 71 to the brake cylinder port 25 through passages 26 and 27, so that brake cylinder pressure will always register in said cavity 70. In the valve seat is formed a small port 72 which opens into the brake cylinder cavity 70. The valve seat is also formed with an exhaust port 73 which leads directly to atmosphere. The pilot valve is formed on its face with an exhaust groove 74, which, when the triple valve is in position to charge the brake pipe reservoir, will connect the exhaust port 73 to the port 72 so that brake cylinder pressure may pass to atmosphere through said registering ports and groove. The pilot valve seat is also formed with an emergency reservoir charging port 75 which is connected to a charging passage 76 leading to the valve seat of the main slide valve; and with a similar charging port 77 which connects with a passage 78 leading to the emergency reservoir and emergency reservoir chamber 45 through passage 47. The pilot valve is provided with a port 79 which, in charging position of the pilot valve, connects together the two parts of the emergency reservoir charging ports as shown in Fig. 1. The pilot valve is also provided with an application port 80 which is adapted to be brought into register with the port 72 when the parts are moved to application position, to permit brake pipe air to pass from chamber 7 through the pilot valve ports to cavity 70 and thence to the brake cylinder through passages 71 and 27.

The main slide valve is formed with an emergency reservoir charging port 81 which, in the charging position of the main slide valve, registers with a port 82 in the main slide valve seat. The port 82 communicates with emergency reservoir charging passage 83, which latter passage is connected to the charging passage 76 leading to the pilot valve seat. The upper end of the charging port 81 is provided with a forwardly extending groove 85. The graduating valve is formed with an emergency reservoir charging port 86 which is adapted to register with the corresponding port 81 in the main slide valve when the graduating valve has been moved into position to charge the emergency reservoir, as shown in Fig. 5$^b$.

The main slide valve is provided on its under side with an exhaust groove 87 which, in the full-release position of the main slide valve, connects the brake cylinder exhaust port 88 with a passage 89 which leads to the quick-release valve, as will be more fully hereinafter described.

The main slide valve is also formed with an emergency reservoir discharging port 90 which is adapted, in the full-release position, to register with a port 91 in the valve seat, this latter port being in communication with the passage 47 leading to the emergency reservoir and the emergency reservoir chamber 45, (Figs. 4, 4$^a$ and 4$^b$). The port 90 extends in an indirect manner to the upper surface of the slide valve and is adapted to communicate with the release groove 92 in the under side of the graduating valve. This groove is also adapted to register with a discharge port 93 in the main slide valve. This latter port, in the full-release position of the valve, registers with a port 94 in the slide valve seat, said port 94 communicating with a passage 95 which extends to the quick-release valve, as will be more fully hereinafter described.

The main slide valve is formed with an emergency port 90$^a$ which is adapted to register with the passage 47 when the main slide valve is in emergency position (Fig. 8$^a$).

The main slide valve seat is provided with a port 96 which is in communication with the passage 44$^a$. The main slide valve is provided with a vent groove 97 which connects the port 96 with a vent port 98 which is in direct communication with the atmosphere at all times except in the emergency position of the slide valve, so that the passage 44$^a$ and the two chambers 44 and 55 connected thereto will be open to atmosphere except in emergency applications.

The main slide valve seat is formed with a port 99 which is connected to a passage 100 which leads into the emergency brake pipe chamber 2, and the main slide valve is formed with a port 101 which is adapted to be brought into register with the port 99 when the valves are moved to service application position. The graduating valve is provided with a port 102 which is brought into register with main slide valve port 101 in the service position of the valves, so that brake pipe reservoir air may flow into the emergency brake pipe chamber during service applications of the brakes, as shown in Figs. 6, 6$^a$ and 6$^b$.

The main body of the triple valve is formed at one side with a quick-release valve chamber 103 in which is arranged a manually operable slide valve 104, said valve being provided with an operating stem 105 which extends downwardly through a slot in the valve casing, its lower end being exposed and in convenient position for manipulation. The quick-release valve chamber is in communication with the chamber 9 through an extension of the port 15 so that brake pipe reservoir pressure will be registered in said valve chamber above the quick-release valve. The quick-release valve seat 106 is formed with a port 107 which is in communication at its lower end with passage 95, said passage, as hereinbefore set forth, leading to the emergency reservoir discharge ports and passages of the main slide valve whereby when the main slide valve is in full-release position emergency reservoir air will be delivered to the port 107. The quick-release valve is formed with a groove 108 which, when the valve is in quick-release position, registers at one end with the quick-release port 107, and at its other end with a port 109 in the valve seat, this latter port communicating with a passage 110 which leads to the brake pipe passage 4 in the triple valve body. In the passage 110 is arranged a spring-pressed check valve 111, said check valve seating toward the quick-release valve, thereby preventing air passing from the brake pipe passage 4 to the quick-release valve ports, but opening to permit the emergency reservoir air to pass to the brake pipe when the valve is adjusted for quick-release operations.

The quick-release valve seat is also formed with a port 112 which communicates with a passage 113 leading directly to the brake cylinder passage 26 so that brake cylinder pressure will be always registered in said passage and port. The quick-release valve is also formed with an exhaust groove 114 which, when the valve is in quick-release position, registers with the port 112. The release groove also communicates with a port 115 in the valve seat, this latter port being in communication with a passage 89 leading to the main slide valve seat. It is manifest that when the quick-release valve is moved into quick-release position brake cylinder pressure will be exhausted through the main slide valve when said valve is in full-release position.

When it is desired that the triple valve shall operate in graduated release the quick-release valve is manually shifted to a position opposite that shown in Fig. 14 so that the ports in the quick-release valve seat will all be blanked as shown in Fig. 15, and the quick-release valve rendered inoperative. In this position of the quick-release valve the main slide valve movement to quick-release position will be an idle operation in so far as the release of the brakes is concerned, and the release of brake cylinder pressure will take place entirely through the exhaust ports in the pilot valve and will be controlled entirely by the diaphragms 37, 40 and 43, said diaphragms moving in response to variations of pressure in brake pipe chamber 7.

In the emergency brake pipe chamber 2 is arranged an emergency piston 116 to which is connected a stem 117 having depending lugs 118 at its ends and between which lugs is arranged an emergency slide valve 119. A slight clearance is provided between the slide valve and said lugs to permit the emergency piston to have a slight reciprocation without moving the emergency valve. This is for the purpose of preventing the emergency piston sticking in its cylinder, and insures it in operative condition at all times. Axially in line with the emergency piston stem is a spring-pressed plunger 120 which is normally forced toward the emergency valve by the replacing spring 121, a collar 122 on the plunger normally engaging a cross wall of the valve casing and properly positioning the plunger head with respect to the emergency valve stem. The emergency valve is formed with two ports 123 which are adapted to register with exhaust ports 124 in the valve casing when the slide valve is moved to emergency position to thereby exhaust the brake pipe directly to atmosphere. The emergency piston is arranged to reciprocate in a cylindrical casing mounted in one end of the quick-action chamber E, said chamber being provided with a stop 125 to limit the movement of the piston in one direction. The emergency piston is subject to brake pipe pressure on one side, and on the other side to the pressure of the air in the quick-action chamber E. The emergency brake pipe chamber 2 is formed with a groove 126. The piston 116 is provided on its inner face with a contact ring 116ª which is adapted to engage the inner wall of the chamber 2 when the piston is at the inner limit of its travel; and in said contact ring is formed a restriction groove 116ᵇ through which air will pass to the brake pipe and thence to atmosphere when the parts are in emergency position. When the emergency piston is in emergency position air in the quick-action chamber may leak through said groove 126 around the emergency piston, through the restriction groove 116ᵇ, into the brake pipe, the replacing spring acting to move the emergency slide valve to close the exhaust ports upon an equalization of pressures in the emergency brake pipe chamber and the quick-action chamber.

The quick-action chamber E is directly connected through a passage 127 with the brake pipe reservoir chamber 9 so that brake pipe reservoir pressure will be always registered in the quick-action chamber, except when the main slide valve is moved to emergency position, said valve in that position blanking passage 127 and closing communication therethrough, as shown in Fig. 8. The object of port 127 is to provide a large actuating volume to insure a positive emergency action of piston 116 at all times after service applications of the brakes.

*Charging and release position.*

The admission of brake pipe pressure to chamber 2 will operate the emergency slide valve 119 and piston 116 to the position shown in Fig. 1, and the pressure admitted to chamber 3 will move the main slide valve and its piston to the position shown in Figs. 1, 4 and 4ª. The diaphragms 37, 40 and 43 also will be moved to the positions shown in Fig. 1, and the parts then will be in full-release and brake pipe reservoir charging position. From chamber 3 the brake pipe pressure will flow to chamber 9 through charging port 16 and the restriction groove 18 in contact ring 17; and from chamber 9 air will flow directly to the brake pipe reservoir through passage 15 and pipe connection D'. When the brake pipe reservoir and chamber 9 have been charged practically to an equality with the brake pipe pressure in chamber 3, the actuating spring 22 will move the piston 11, stem 12 and graduating valve 10ª to the left, the clearance provided between the lug 13 and the end of the slide valve permitting this without moving the main slide valve. When the head 20 of the actuating stem 19 engages the cross wall 21 the charging groove 16 will be lapped by the piston 11 and the emergency reservoir charging port 86 will register with the port 81 in the slide valve, and air will flow from chamber 9 to the emergency reservoir through passage 82—83, port 79 of the pilot valve, passage 77—78, to emergency reservoir chamber 45, and through passage 47 to the emergency reservoir. Port 32 is also uncovered but has no operating function as ports 30 and 31 of passage 29 are lapped, as shown in Fig. 5. When this communication is established the pressure in chamber 9 will be reduced below the brake pipe pressure in chamber 3, with the result that the piston 11 will move the graduating valve to the right against the tension of the spring 22, until the charging groove 16 has been uncovered to permit a flow of air therethrough to chamber 9 equivalent to that which is flowing to the emergency reservoir through port 86. When the emergency reservoir has been charged to the brake pipe pressure the pressures on each side of the piston 11 will be equalized and the spring 22 will again move the piston and the parts connected therewith to the left and blank the groove 16, but the charging port 86 will still be in communication with the emergency reservoir port 81 through the groove 85 extending therefrom. This position is the emergency reservoir charged position, the parts being shown in their relative positions in Figs. 5, 5ª, and 5ᵇ.

During the operation just described there has been no movement of the main slide valve 10, the valve movements being confined entirely to the graduating valve.

With the valve adjusted for graduated release the release position of the main slide valve will be merely an idle one, the brake cylinder being exhausted to atmosphere through the exhaust ports in the pilot valve. If, however, the triple valve is adjusted for quick-release operations the brake cylinder pressure will be exhausted to atmosphere through the release ports and grooves of the main slide valve, as will be more fully hereinafter pointed out when setting forth the quick-release operation of the triple valve.

*Service and lap position.*

Referring to Figs. 5, 5ª and 5ᵇ, which illustrate the emergency reservoir charged position, the groove 92 in the graduating valve is out of register with the port 90, in order to prevent the emergency reservoir pressure from returning to the brake pipe through ports 90 and 93, passage 95, groove 108, passage 110, past check valve 111 and passage 4 when the quick-release valve is in the position shown in Fig. 14. To obtain a service application of the brakes the usual brake pipe reduction is made, resulting in a corresponding reduction in chambers 2, 3 and 7. The charging port 86 is in register with emergency reservoir port 81 and affords free communication between the said emergency reservoir and brake pipe reservoir chamber 9, but as the charging groove 16 is lapped by the piston 11 there will be no escape of emergency reservoir, or brake pipe reservoir, air to the brake pipe when the service reduction is made, until the main slide valve has been moved to service position. Therefore, the combined emergency reservoir and brake pipe reservoir volumes will oppose the reduced brake pipe pressure and will move the slide valve and piston to service position, as shown in Figs. 6, 6ª and 6ᵇ, insuring positive movement of the slide valve under all conditions.

To further assure positive action of the main slide valve when slow brake pipe reductions are made (such as occur at and near the rear end of a long train) the pilot valve 65 is provided. In the arrangement of pilot valve shown, when the brake pipe pressure in chamber 7 is reduced below the emergency reservoir pressure above diaphragm 43 (there being no pressure in chambers 44 and 55 at this time), the diaphragms will be lowered, thereby lowering the left-hand end of the lever 67 and raising the right-hand end to move the pilot valve to opposite position to that shown in Fig. 1. (Fig. 12). The charging port will be then cut off from the passages 75 and 77 and the release groove 74 will be moved away from the brake cylinder port 72. Brake pipe pressure will then flow to the brake cylinder through the ports 80—70, passages 71, 27 and 28, thereby causing a positive reduction in brake pipe chamber 3 locally on each car, and further insuring the positive movement of the piston 11 and the main slide valve 10 to the position shown in Figs. 6, 6ª and 6ᵇ, compressing the service spring 34 until the sleeve 33 engages the head of plunger 35. The piston will stop at this point as it is impossible to establish, by a service reduction of brake pipe air, a differential of pressure on each side of the piston 11 sufficient to compress emergency spring 36. The service port 32 having been previously uncovered, as described, by the graduating valve 10ª, port 30 will be moved into communication with brake cylinder port 25. At the same time ports 102 and 101, and 99 will be in register to permit brake pipe reservoir air to flow from chamber 9 to the emergency brake pipe chamber 2 and to brake pipe through passages 6 and 4, as shown in Fig. 2. The charging port 81 will be moved away from the passage 82 to seal the emergency reservoir. Brake pipe reservoir air then will flow to the brake cylinder through the ports 29 and 30 and passage 25. When the pressure in chamber 9 has been reduced to an equality with the brake pipe pressure in chamber 3 the spring 34 will move piston 11 and the graduating valve 10ª to the position shown in Figs. 7, 7ª and 7ᵇ, or until the lug 14 engages the slide valve 10, thereby closing ports 32 and port 101 to prevent further flow of air from chamber 9 to brake pipe and brake cylinder.

If the first operation of the slide valve just described does not admit air into the brake cylinder under sufficient pressure to lap the pilot valve of the triple valve, the pilot valve will remain in service position and the reduction in pressure in chamber 3 will continue through the pilot valve, with the result that the main slide valve and its piston will again be moved to service position by the dominating pressure in chamber 9, and the brake cylinder charging operation will be repeated and the slide valve again moved back to lap position. These operations will continue until the pressure in the brake cylinder and in the equalizing chamber 41, which is in direct communication with the brake cylinder, has been built up to the desired degree. This degree of pressure will be in proportion to the reduction in brake pipe pressure and, plus the pressure of the brake pipe air in chamber 7, will be sufficient to overcome the emergency reservoir pressure in chamber 45 and move the pilot valve to lap position. It is to be noted that the equalizing diaphragm 40 is of larger area than the actuating diaphragm 37 and the emergency diaphragm 43, and the degree of pressure that will be built up in the brake cylinder for a given brake pipe reduction will depend upon the relative areas of these diaphragms. It is manifest that the movement of the main slide valve back to lap position does not close communication between the brake pipe and the brake cylinder, this communication remaining open through the chamber 7, pilot valve port 80 and brake cylinder port 70. It is only when the brake cylinder pressure has been built up to the desired degree that both the main slide valve and the pilot valve will be moved to lap position and all service ports be closed. In both the service and lap positions of the main slide valve, and pilot valve, chambers 44 and 55 will be vented to atmosphere through the passages 54, 44ª, port 96 and vent port 98, the groove 97 being provided to maintain this communication during all positions of the main slide valve other than the emergency position. During service applications the variations in the pressure in the quick-action chamber and the emergency brake pipe chamber will cause the emergency piston to have a slight reciprocation, as hereinbefore pointed out, the object being to prevent the piston becoming set or stuck in the cylinder. This slight reciprocation of the piston does not affect the emergency slide valve as the variations in pressure are at no time sufficient during the service reductions of brake pipe pressure, to cause the emergency piston to compress the emergency spring 121.

It is manifest that should brake cylinder pressure be reduced by leakage when the triple valve, including the pilot valve, is in service lap position, the emergency reservoir pressure in chamber 45 will cause the diaphragms to move downwardly thereby moving the pilot valve to service position, bringing the port 80 into register with the pilot valve brake cylinder port 72. Brake pipe air thereupon will flow from chamber 7 to the brake cylinder and to chamber 41. This flow of air will continue until the pressure is built up in said chamber sufficiently to overcome the preponderating pressure in the emergency reservoir chamber 45. This compensation for brake cylinder leaks will, if the leak is excessive, cause an operation of the main slide valve to service position. It is, therefore, manifest that to maintain a given brake cylinder pressure it is only necessary to maintain the brake pipe pressure at a predetermined point below the emergency reservoir pressure.

*Graduated release.*

When the triple valve is operating in graduated release the quick-release valve is in position to close ports 107, 109 and 115 and 112, as hereinbefore described (Fig. 15). This renders the main slide valve inoperative in release position and compels the brake cylinder air to be released through the ports of the pilot valve. To secure a graduated release the brake pipe pressure is raised a given amount, for instance five pounds, with the result that the increased brake pipe pressure in chamber 7 and the pressure in the equalizing chamber 41 will overcome the pressure in the emergency reservoir chamber 45. The diaphragms will be raised and the pilot valve slide valve lowered or brought to the position shown in Fig. 1. Brake cylinder pressure will be released to atmosphere through passages 27, 26, port 72, groove 74 and exhaust port 73. The pilot valve will remain in this position until the pressure in the brake cylinder and in chamber 41 is reduced in proportion to the increase in brake pipe pressure in chamber 7, at which time the balance will again be established and the pilot valve brought back to lap position, shown in Fig. 13. A further increase of brake pipe pressure will result in a further reduction of brake cylinder pressure. It is also manifest that a decrease in brake pipe pressure will result in an added brake cylinder pressure so that when the triple valve is adjusted for graduated release operations the brake cylinder pressure may be graduated up and down as desired by properly varying the brake pipe pressure.

A rapid graduated release may be secured by placing the engineer's brake valve in full-release position, thereby quickly building up the brake pipe pressure at the rear end of a long train. It is manifest that under this condition the release of the brakes will be very gradual even on the head end of the train. This will enable the engineer to secure practically a uniform slow release of all brakes without regard to the length of the train.

Quick release.

To adapt the triple valve for a quick release of the brakes the quick-release valve is manually moved to the position shown in Fig. 14. On an increase of brake pipe pressure above that in chamber 9 the piston 11 and the main slide valve will be moved to the position shown in Figs. 1 and 4, 4ª and 4ᵇ. This permits emergency reservoir air to pass to the brake pipe through the passage 47 and ports 91 and 90, groove 92 in the graduating valve, through ports 93, 94, passage 95 and port 107 to groove 108 of the quick-release valve, and thence past check valve 111 and through passage 4 to brake pipe. The brake cylinder pressure will pass directly to the quick-release valve through passage 113, thence through groove 114, port 115, passage 89, release groove 87 to exhaust port 88. When the quick-release valve is in operative position a quick release of the brakes will be secured when the graduating valve and the main slide valve are moved to full-release position. With the main slide valve and main piston in full-release position the increasing brake pipe pressure will flow through the charging groove 16 and restriction groove 18 to chamber 9 and thence to the brake pipe reservoir and chamber 52. Upon an equalization of pressures in the brake pipe and chamber 9 the main piston and graduating valve will move to emergency reservoir charging position (Fig. 5), as hereinbefore described.

Emergency position.

An emergency application may be obtained by a sudden and prolonged reduction in brake pipe pressure in the usual manner. This reduction of brake pipe pressure will take place faster in chambers 2, 3 and 7 than in the brake pipe reservoir chamber 9 and quick-action chamber E. This rapid reduction will cause a sufficient differential of pressure on pistons 116 and 11 to move them to their extreme left-hand position, thereby bringing the emergency slide valve ports 123 into register with the brake pipe exhaust ports 124 to thereby vent the brake pipe air directly to atmosphere. The pressure in chamber 9 thereupon will compress both the service spring 34 and the emergency spring 36 until the piston engages the gasket 130 to maintain a seal between chamber 9 and the brake pipe. The main slide valve 10 then will be in the position shown in Figs. 8, 8ª and 8ᵇ, the brake cylinder port 25 being uncovered and the emergency port 90ª being in register with the emergency reservoir port 91 to permit emergency reservoir air to flow to the chamber 9. Both the brake pipe reservoir and the emergency reservoir air then will flow to the brake cylinder through port 25. In the emergency position of the slide valve groove 97 will be out of register with port 96 and port 31 will be in register with port 96 to admit air from chamber 9 to chambers 44 and 55 through passage 44ª. These are the chambers which, in all other positions of the triple valve, are vented to atmosphere through the port 96 and vent port 98. The object of admitting air under pressure to chamber 44 is to balance the pressures on opposite sides of the diaphragm 40 so that brake pipe pressure in chamber 7 must be raised above the brake cylinder pressure in chamber 45 in order to secure a release of the brakes. When this emergency reduction is made the diaphragms 37, 40 and 43 will be moved downward and the pilot valve brought to service position, thereby permitting the emergency brake cylinder pressure to flow through ports 72 and 80 into chamber 7. Air cannot flow from chamber 7 through port 8 to chamber 3 because said port will be closed by the piston 11 as shown in Fig. 8. In the emergency position of the main slide valve the port 127 will be closed to prevent air from chamber 9 (which is equalized brake cylinder pressure) from flowing into the quick-action reservoir E and to permit the pressure in the said reservoir to leak down to atmosphere around emergency piston 116 through groove 126. Upon an equalization of pressures on opposite sides of the emergency piston the emergency spring 121 will move the emergency slide valve to lap position and thereby close the exhaust ports 124.

To obtain a release of the brakes, after an emergency application, the brake pipe pressure, and likewise the pressure in chambers 2 and 3, must be raised to an equality with the brake cylinder pressure in chamber 9, whereupon the piston 11 and the main slide valve 10 will be moved to full-release and charging position, thereby opening passage 8 between chambers 3 and 7. The increasing pressure in chamber 7 will raise the diaphragms 37, 40 and 43 to release position. The movement of the main slide valve to full-release position will cause groove 97 to connect port 96 to vent port 98 and thereby vent chambers 44 and 55 to atmosphere, as hereinbefore set forth.

*Automatic emergency.*

When an abnormal brake pipe reduction has been made, either by excessive brake pipe leakage, careless manipulation of the engineer's brake valve, or through any other cause, the triple valve parts are moved into proper position to secure an automatic emergency application of the brakes. The emergency reservoir pressure under valve 56 opposes the brake pipe reservoir pressure in chamber 52. The relative areas of the valve 56 and of the diaphragm 50 are such, preferably, that when a fifty-pound reduction is made in the brake pipe, a like reduction in pressure taking place in chambers 9 and 50, the undisturbed emergency reservoir pressure in chamber 45 will open valve 56 until the stem 59 of valve 57 engages stop 60. This will permit emergency reservoir air to flow into chamber 55 thereby raising diaphragm 50 and opening valve 57. Emergency reservoir air thereupon will pass around valve 57, through ports 62 into chamber 52 and thence into chamber 9 through passage 53. From chamber 9 the increasing pressure will flow through port 127 into quick-action reservoir E, with the result that the emergency piston and slide valve will be moved to emergency position. The main piston and its slide valve will also be moved to emergency position.

Upon a full release of the brakes, should the brake pipe pressure be raised sufficiently to cause an over-charge of the brake pipe reservoir through chamber 9, no excess pressure can flow to the emergency reservoir. As hereinbefore pointed out, when the triple valve is in brake pipe reservoir charging position the emergency reservoir charging port is closed. It is manifest, therefore, that there can be no direct overcharge or excess pressure in the emergency reservoir. Air flows to the emergency reservoir only upon an equalization of pressures in the brake pipe and in the brake pipe reservoir chamber 9. Should there be an excess pressure in the brake pipe reservoir and in chamber 9, a reduction of the brake pipe pressure to normal running pressure will permit the excess pressure in chamber 9 to move the triple valve to service position, thereby permitting air to flow from chamber 9 to the brake cylinder. As the pilot valve will be in release position it is manifest that whatever air may be admitted to the brake cylinder through the main slide valve will be exhausted to atmosphere through the pilot valve. It is manifest, therefore, that while an excess pressure, or an overcharge, of the brake pipe reservoir will result in the main triple valve slide valve moving to application position upon a reduction of train pipe pressure to normal, the air thus admitted to the brake cylinder will be automatically exhausted to atmosphere through the pilot valve. The engineer reduces his brake pipe pressure to normal running pressure and whatever excess pressure there may be in the brake pipe reservoir will be automatically exhausted to atmosphere through the triple valve and the pilot valve. It is manifest that as soon as there is an equalization of pressures on opposite sides of the piston 11 the main slide valve will move to lap position, at which time the brake pipe reservoir pressure and the pressure in chamber 9 will have been reduced to an equalization with the normal running brake pipe pressure. Air will not pass into the emergency reservoir while the triple valve is in full-release position, and can only pass to the emergency reservoir when there has been an equalization of pressures in chamber 9 and brake pipe.

When the triple valve is adjusted for operating in graduated release it is manifest that the piston 11 in the main slide valve may move to full-release position by full-release pressure, without in any way increasing the speed of the release through the triple valves near the head end of the train. The result of this is that the full-release pressure may be caused to flow rapidly through the brake pipe toward the rear end of the train to thereby secure a substantially uniform slow full release of the brakes through the pilot valves. It is, therefore, manifest that the pilot valve not only affords a means for securing a graduated release of the brakes but also a means for securing a slow full release of the brakes under full-release pressure in the brake pipe, the said pilot valve in that capacity serving as a retarded release valve.

Features of the invention disclosed but not claimed are claimed in applicant's Patent No. 1,411,368, dated April 4, 1922.

What I claim is:

1. An air brake apparatus comprising an emergency reservoir, a brake pipe reservoir, a brake cylinder, a brake pipe and a triple valve, means in said triple valve subject to brake pipe pressure and brake pipe reservoir pressure and operating upon a reduction in brake pipe pressure to open communication between the brake pipe reservoir and the brake cylinder, said communication being closed upon an equalization of pressures in the brake pipe and the brake pipe reservoir, and means in said triple valve operated by emergency reservoir pressure upon a reduction of brake pipe pressure to place the brake pipe in communication with the brake cylinder, said means closing said communication when the brake cylinder pressure and the reduced brake pipe pressure dominate the emergency reservoir pressure.

2. A triple valve for air brake apparatus formed with a brake pipe chamber, a brake pipe reservoir chamber, an emergency reservoir chamber, means in said triple valve subject to brake pipe pressure and brake pipe reservoir pressure and operating upon a reduction in brake pipe pressure to open communication between the brake pipe reservoir chamber and the brake cylinder, said communication being closed upon an equalization of pressures in the brake pipe and brake pipe reservoir chambers, and means in said triple valve operated by pressure in the emergency reservoir chamber upon a reduction of pressure in the brake pipe chamber to place the brake pipe in communication with the brake cylinder, said means closing said communication by brake cylinder pressure.

3. An air brake apparatus comprising an emergency reservoir, a brake pipe reservoir, a brake pipe, a brake cylinder, means subject to brake pipe pressure and brake pipe reservoir pressure and operating upon a reduction in brake pipe pressure to open communication between the brake pipe reservoir and the brake cylinder, said communication being closed upon an equalization of pressures in the brake pipe and in the brake pipe reservoir, and means operated by emergency reservoir pressure upon a reduction of brake pipe pressure to place the brake pipe in communication with the brake cylinder, said means closing said communication when the combined brake cylinder pressure and reduced brake pipe pressure dominates the emergency reservoir pressure.

4. An air brake apparatus comprising an emergency reservoir, a brake pipe reservoir, a brake pipe, a brake cylinder, means subject to brake pipe pressure and brake pipe reservoir pressure and operating upon a reduction in brake pipe pressure to open communication between the brake pipe reservoir and the brake cylinder, said communication being closed upon an equalization of pressures in the brake pipe and in the brake pipe reservoir, means operated by emergency reservoir pressure upon a reduction of brake pipe pressure to place the brake pipe in communication with the brake cylinder, said means closing said communication when the combined brake cylinder pressure and reduced brake pipe pressure dominates the emergency reservoir pressure, and means operating upon a sudden reduction in brake pipe pressure to place the emergency reservoir and the brake pipe reservoir in communication with the brake cylinder for an emergency application of the brakes.

5. A triple valve for air brake apparatus formed with a brake pipe chamber, a brake pipe reservoir chamber, an emergency reservoir chamber, means in said triple valve subject to brake pipe pressure and brake pipe reservoir pressure and operating upon a reduction in brake pipe pressure to open communication between the brake pipe reservoir chamber and the brake cylinder, said communication being closed upon an equalization of pressures in the brake pipe and brake pipe reservoir chambers, means in said triple valve operated by pressure in the emergency reservoir chamber upon a reduction of pressure in the brake pipe chamber to place the brake pipe in communication with the brake cylinder, said means closing said communication by brake cylinder pressure, and means operating upon a sudden reduction in brake pipe pressure to place the emergency reservoir and the brake pipe reservoir in communication with the brake cylinder for an emergency application of the brakes.

6. An air brake apparatus comprising an emergency reservoir, a brake pipe reservoir, a brake cylinder, a brake pipe, means operating upon an increase of brake pipe pressure to open communication between the brake pipe and the brake pipe reservoir for charging the same, said means closing communication between the brake pipe reservoir and the emergency reservoir and operating upon an equalization of pressures in the brake pipe reservoir and the brake pipe to open communication between the brake pipe reservoir and the emergency reservoir for charging the same, means operated by emergency reservoir pressure to open a brake cylinder exhaust port when the brake pipe pressure is at normal running pressure, and means operated by brake pipe reservoir pressure when said pressure exceeds brake pipe pressure to admit brake pipe reservoir pressure to the brake cylinder, whereby an excessive brake pipe reservoir pressure will be automatically vented to atmosphere through the brake cylinder until the said excessive pressure is reduced to normal running pressure.

7. An air brake apparatus comprising an emergency reservoir, a brake pipe reservoir, a brake cylinder, a brake pipe, and two valves operated by a reduction of brake pipe pressure, one placing the brake pipe reservoir in communication with the brake cylinder and closing said communication upon an equalization of brake pipe and brake pipe reservoir pressures, the other placing the brake pipe in communication with the brake cylinder and closing said communication when a predetermined brake cylinder pressure is secured.

8. An air brake apparatus comprising an emergency reservoir, a brake pipe reservoir, a brake cylinder, a brake pipe, and two valves operated by a reduction of brake pipe pressure, one placing the brake pipe reservoir in communication with the brake cylinder and closing said communication upon an equalization of brake pipe and brake pipe reservoir pressures, the other placing the brake pipe in communication with the brake cylinder and closing said communication when a predetermined brake cylinder pressure is secured, said valve being controlled by brake pipe and emergency reservoir pressures.

9. A triple valve for an air brake apparatus in which brake pipe and brake pipe reservoir air is used for service applications of the brakes and emergency reservoir air is used for emergency applications of the brakes, provided with means for admitting brake pipe reservoir air to the brake cylinder upon a reduction of brake pipe pressure, said means being controlled by brake pipe and brake pipe reservoir pressures, and with means operating upon a reduction of brake pipe pressure to admit brake pipe air to the brake cylinder, this latter means being controlled by brake cylinder, brake pipe, and emergency reservoir pressures.

10. A triple valve for an air brake apparatus in which brake pipe and brake pipe reservoir air is used for service applications of the brakes and emergency reservoir air is used for emergency applications of the brakes, and provided with means for admitting brake pipe reservoir air to the brake cylinder upon a reduction of brake pipe pressure, said means being controlled by brake pipe and brake pipe reservoir pressures, and with means operating upon a reduction of brake pipe pressure to admit brake pipe air to the brake cylinder, this latter means being controlled by brake cylinder, brake pipe, and emergency reservoir pressures, and means operating upon a sudden reduction of brake pipe pressure to place the emergency reservoir and brake pipe reservoir in communication with the brake cylinder for an emergency application of the brakes.

11. An air brake apparatus comprising an emergency reservoir, a brake pipe reservoir, a brake cylinder, a brake pipe, a triple valve, means whereby an increase of brake pipe pressure will open communication between the brake pipe and the brake pipe reservoir and close communication between the brake pipe reservoir and the emergency reservoir, and means operating upon an equalization of pressures in the brake pipe and brake pipe reservoir to open communication between the emergency reservoir and the brake pipe reservoir while maintaining communication between the brake pipe and the brake pipe reservoir.

12. An air brake apparatus comprising a brake pipe, an emergency reservoir, a brake pipe reservoir, a brake cylinder, a triple valve, a main slide valve in said triple valve, means opening communication between the brake pipe and the brake pipe reservoir and closing communication between the brake pipe reservoir and the emergency reservoir when the slide valve is at the inner limit of its movement, and means to open communication between the brake pipe reservoir and the emergency reservoir without moving the main slide valve and while maintaining communication between the brake pipe and the brake pipe reservoir.

13. An air brake apparatus comprising a brake pipe, an emergency reservoir, a brake pipe reservoir, a brake cylinder, a triple valve, a main slide valve in said triple valve, means opening communication between the brake pipe and the brake pipe reservoir and closing communication between the brake pipe reservoir and the emergency reservoir when the slide valve is at the inner limit of its movement, means to open communication between the brake pipe reservoir and the emergency reservoir without moving the main slide valve and while maintaining communication between the brake pipe and the brake pipe reservoir, and an independent valve operated by brake pipe pressure and interposed between the main slide valve and the emergency reservoir and permitting only a slow charging of the emergency reservoir.

14. A triple valve, a main slide valve therein, a graduating valve, a pilot valve, a quick-release valve interposed between the graduating valve ports and the main slide valve ports to control communication between an emergency reservoir and the brake pipe and between the brake cylinder and the atmosphere through said main slide valve, and means whereby the pilot valve will control communication between the main slide valve and the emergency reservoir and between the brake cylinder and atmosphere and the brake pipe and brake cylinder.

15. A triple valve, a main slide valve therein, a graduating valve, a pilot valve, a manually operable quick-release valve interposed between the graduating valve ports and the main slide valve ports to control communication between an emergency reservoir and the brake pipe and between the brake cylinder and atmosphere through said main slide valve, and means whereby the pilot valve will control communication between the main slide valve and the emergency reservoir and between the brake cylinder and atmosphere and the brake pipe and brake cylinder.

16. A triple valve for an air brake apparatus in which brake pipe and brake pipe reservoir air is used for service applications of the brakes and emergency reservoir air is used for emergency applications of the brakes, provided with a brake pipe chamber, a brake pipe reservoir chamber, a quick-action reservoir normally in communication with the brake pipe reservoir chamber, an emergency brake pipe chamber, an emergency piston subject to the opposing pressures in the quick-action reservoir and emergency brake pipe chamber, a venting valve operated by said piston upon a variation of said pressures, means operating upon a slow reduction of brake pipe pressure to open communication between the brake pipe reservoir and the brake cylinder, and means operating upon a sudden reduction in brake pipe pressure to open communication from the emergency reservoir into the brake pipe reservoir chamber and thence to the brake cylinder.

17. A triple valve for an air brake apparatus in which brake pipe and brake pipe reservoir air is used for service applications of the brakes and emergency reservoir air is used for emergency applications of the brakes, provided with a brake pipe chamber, a brake pipe reservoir chamber, a quick-action reservoir normally in communication with the brake pipe reservoir chamber, an emergency brake pipe chamber, an emergency piston subject to the opposing pressures in the quick-action reservoir and emergency brake pipe chamber, a venting valve operated by said piston upon a variation of said pressures, means operating upon a slow reduction of brake pipe pressure to open communication between the brake pipe reservoir and the brake cylinder, means operating upon a sudden reduction in brake pipe pressure to open communication from the emergency reservoir into the brake pipe reservoir chamber and thence to the brake cylinder, means closing communication between the brake pipe reservoir chamber and the quick-action reservoir when the triple valve moves to emergency application position, and means to permit pressure in the quick-action reservoir to leak around the emergency piston to equalize with the reduced pressure in the emergency brake pipe chamber.

18. A triple valve for an air brake apparatus in which brake pipe and brake pipe reservoir air is used for service applications of the brakes and emergency reservoir air is used for emergency applications of the brakes, provided with means operating upon a slow reduction of brake pipe pressure to place the brake pipe reservoir in communication with the brake cylinder and brake pipe and to place the brake pipe in communication with the brake cylinder.

19. A triple valve for an air brake apparatus in which brake pipe and brake pipe reservoir air is used for service applications of the brakes and emergency reservoir air is used for emergency applications of the brakes, provided with means operating upon a slow reduction of brake pipe pressure to place the brake pipe reservoir in communication with the brake cylinder and brake pipe and to place the brake pipe in communication with the brake cylinder, and also provided with means controlled by brake cylinder pressure for controlling the communication between the brake pipe and the brake cylinder.

20. A triple valve for an air brake apparatus in which brake pipe and brake pipe reservoir air is used for service applications of the brakes and emergency reservoir air is used for emergency applications of the brakes, provided with means operating upon a slow reduction of brake pipe pressure to place the brake pipe reservoir in communication with the brake cylinder and brake pipe and to place the brake pipe in communication with the brake cylinder, the means controlling communication between the brake pipe reservoir and the brake cylinder and brake pipe being subject to the opposing pressures of brake pipe and brake pipe reservoir.

21. A triple valve for an air brake apparatus in which brake pipe and brake pipe reservoir air is used for service applications of the brakes and emergency reservoir air is used for emergency applications of the brakes, provided with means operating upon a slow reduction of brake pipe pressure to place the brake pipe reservoir in communication with the brake cylinder and brake pipe and to place the brake pipe in communication with the brake cylinder, the means controlling communication between the brake pipe reservoir and the brake cylinder and brake pipe being subject to the opposing pressures of brake pipe and brake pipe reservoir, and the means controlling communication between the brake pipe and the brake cylinder being controlled by brake cylinder pressure.

22. An air brake apparatus comprising a brake pipe, an emergency reservoir, a brake pipe reservoir, a brake cylinder, a triple valve, means in said triple valve to intermittently admit brake pipe reservoir air to the brake cylinder, and independent means in said triple valve to permit a constant flow of air from the brake pipe to the brake cylinder until a predetermined pressure has been built up therein.

23. An air brake apparatus comprising an emergency reservoir, a brake pipe reservoir, a brake cylinder, a brake pipe and a triple valve, means in said triple valve subject to brake pipe pressure and brake pipe reservoir pressure and operating upon a reduction in brake pipe pressure to open communication between the brake pipe reservoir and the brake cylinder, said communication being closed upon an equalization of pressures in the brake pipe and the brake pipe reservoir, means in said triple valve operated by emergency reservoir pressure upon a reduction of brake pipe pressure to place the brake pipe in communication with the brake cylinder, said means closing said communication when the brake cylinder pressure and the reduced brake pipe pressure dominates the emergency reservoir pressure, and means operated by emergency reservoir pressure upon a slow reduction of brake pipe pressure below a certain predetermined degree to open communication between the emergency reservoir and the brake cylinder through the triple valve for an emergency application of the brakes.

24. A triple valve formed with a brake pipe chamber, a brake pipe reservoir chamber, a main slide valve in said latter chamber, a piston connected to said slide valve and subject to the opposing pressures in the brake pipe chamber and brake pipe reservoir chamber, ports being provided in the main slide valve chamber to connect said chamber with an emergency reservoir, said ports being open upon an equalization of pressures in the brake pipe chamber and brake pipe reservoir chamber whereby upon a reduction of brake pipe pressure the combined brake pipe reservoir and emergency reservoir volumes will operate to move the slide valve piston and slide valve, communication between the emergency reservoir ports and the brake pipe reservoir chamber being closed when the slide valve has completed its movement to application position.

25. A triple valve for an air brake apparatus in which brake pipe and brake pipe reservoir air is used for service applications of the brakes and emergency reservoir air is used for emergency applications of the brakes, provided with a main slide valve and a graduating valve and means whereby the graduating valve will be moved to open communication between the brake pipe reservoir and the emergency reservoir upon an equalization of pressures in the brake pipe and brake pipe reservoir, said communication being closed when the main slide valve is moved to application position upon a reduction of brake pipe pressure.

26. A triple valve for an air brake apparatus in which brake pipe and brake pipe reservoir air is used for service applications of the brakes, provided with a main valve controlled by variations of brake pipe and brake pipe reservoir air for admitting brake pipe reservoir air to the brake cylinder, and a secondary or pilot valve controlled by brake pipe and brake cylinder pressures for admitting brake pipe air to the brake cylinder for applications of the brakes.

27. A triple valve for an air brake apparatus having a main slide valve operating upon a reduction of brake pipe pressure to admit air to the brake cylinder for a service application of the brakes, and a secondary or pilot valve operating upon a reduction of brake pipe pressure to admit brake pipe air to the brake cylinder until a predetermined pressure is built up in said brake cylinder, whereby the movement of the slide valve will be made certain by the local reduction of brake pipe pressure and the desired pressure in the brake cylinder will be built up regardless of brake cylinder leaks and variations in brake cylinder piston travel.

28. A triple valve for an air brake apparatus provided with a main slide valve controlled by opposed brake pipe and brake pipe reservoir pressures and operating upon a reduction of brake pipe pressure to admit brake pipe reservoir air to the brake cylinder for a service application of the brakes until there is an equalization of brake pipe and brake pipe reservoir pressures, and a secondary or pilot valve operated by emergency reservoir pressure upon a reduction of brake pipe pressure to open communication between the brake pipe and the brake cylinder and to maintain said communication open until the brake cylinder pressure and reduced brake pipe pressure dominates emergency reservoir pressure and moves said valve to close said communication.

29. A triple valve for an air brake apparatus provided with a main slide valve controlled by opposed brake pipe and brake pipe reservoir pressures and operating upon a reduction of brake pipe pressure to admit brake pipe reservoir air to the brake cylinder for a service application of the brakes until there is an equalization of brake pipe and brake pipe reservoir pressures, and a secondary or pilot valve operated by emergency reservoir pressure upon a reduction of brake pipe pressure to open communication between the brake pipe and the brake cylinder and to maintain said communication open until the brake cylinder pressure and reduced brake pipe pressure dominates emergency reservoir pressure and moves said valve to close said communication, said pilot valve also operating upon an increase of brake pipe pressure to release brake cylinder pressure and to charge the emergency reservoir when the brake pipe and brake pipe reservoir pressures equalize.

30. A triple valve for an air brake apparatus in which brake pipe and brake pipe reservoir air is used for service applications of the brakes and emergency reservoir air is used for emergency applications of the brakes, provided with a brake pipe chamber, a brake pipe reservoir chamber, a main slide valve in this latter chamber, a piston between the brake pipe chamber and the brake pipe reservoir chamber and connected to the main slide valve, said piston having a slight movement independently of the main slide valve, a graduating valve connected to and adapted to be operated by said piston independently of the main slide valve, an actuating brake pipe chamber in communication with the brake pipe chamber, a movable actuating abutment forming one wall of said actuating chamber, an emergency reservoir chamber, said movable abutment forming one wall of this latter chamber, the emergency reservoir pressure therein opposing the brake pipe pressure in the actuating chamber, a controlling chamber in communication with the brake cylinder and formed between parts of the movable abutment, a pilot valve connected to and movable with said movable abutment, means whereby said pilot valve will control communication between the actuating brake pipe chamber and the brake cylinder and between said cylinder and atmosphere, means whereby the emergency reservoir will be charged through said pilot valve, and means whereby the emergency reservoir can be charged through said pilot valve only upon an equalization of pressures in the brake pipe chamber and the brake pipe reservoir chamber.

31. A triple valve as defined in claim 30 and provided with means whereby the slide valve and graduating valve in full-release position will connect the emergency reservoir with the brake pipe through a quick-release valve and will connect the brake cylinder through said quick-release valve and the main slide valve to atmosphere.

32. A triple valve as defined in claim 31, the quick-release valve being so arranged that when it is in inactive position the release operations of the main slide valve will be idle and the release of the brakes will take place through the pilot valve exhaust ports.

33. A triple valve as defined in claim 16, the emergency brake pipe chamber being in direct communication with the brake pipe whereby upon each reduction of brake pipe pressure for service applications of the brakes there will be a slight reciprocation of the emergency piston due to the reduction of brake pipe pressure and the subsequent equalization of brake pipe and brake pipe reservoir pressures.

34. A triple valve for an air brake apparatus in which brake pipe and brake pipe reservoir air is used for service applications of the brakes and emergency reservoir air is used for emergency applications of the brakes, provided with a brake pipe chamber, a brake pipe reservoir chamber, a main slide valve in this latter chamber, a piston between the brake pipe chamber and the brake pipe reservoir chamber and connected to the main slide valve, said piston having a slight movement independently of the main slide valve, a graduating valve connected to and adapted to be operated by said piston independently of the main slide valve, an actuating brake pipe chamber in communication with the brake pipe chamber, a movable actuating abutment forming one wall of said actuating chamber, an emergency reservoir chamber, a diaphragm forming one wall of said emergency reservoir chamber, a controlling diaphragm interposed between the actuating abutment and the emergency diaphragm, a brake cylinder controlling chamber between the emergency chamber and the actuating chamber, a controlling or equalizing diaphragm forming one wall of said controlling chamber, said equalizing diaphragm being of greater area than the actuating diaphragm, means connecting the controlling chamber to the brake cylinder, means connecting the emergency chamber to the emergency reservoir, and a pilot valve connected to and adapted to be operated by the said movable abutments and diaphragms, said movable abutments and diaphragms being controlled by brake pipe, brake cylinder and emergency reservoir pressures.

35. A triple valve as defined in claim 34 and provided with a supplemental brake pipe reservoir chamber, a supplemental emergency diaphragm forming the lower wall of said chamber, a vented chamber being formed between said latter diaphragm and the emergency reservoir chamber, a check valve controlling communication between said vented chamber and the emergency reservoir chamber and adapted to open into said vented chamber, means connecting the supplemental brake pipe reservoir chamber with the brake pipe reservoir, a valve controlling communication between the said vented chamber and the supplemental brake pipe reservoir chamber, and means in the main slide valve for closing the vent from the said vented chamber upon a reduction in brake pipe pressure sufficient to secure an emergency application of the brakes.

In testimony whereof I hereunto affix my signature.

SPENCER G. NEAL.